United States Patent [19]

Swann

[11] Patent Number: 5,634,253
[45] Date of Patent: Jun. 3, 1997

[54] APPARATUS FOR EXPANDING THE WORKSURFACE OF A VISE-LIKE WORKHOLDING APPARATUS

[75] Inventor: George R. Swann, Gibsonia, Pa.

[73] Assignee: Chick Machine Tool, Inc., Warrendale, Pa.

[21] Appl. No.: 300,374

[22] Filed: Sep. 2, 1994

Related U.S. Application Data

[63] Continuation-in-part of Ser. No. 192,193, Feb. 4, 1994, Pat. No. 5,442,844, which is a continuation of Ser. No. 998,805, Dec. 30, 1992, abandoned, which is a division of Ser. No. 955,361, Oct. 1, 1992, abandoned.

[51] Int. Cl.⁶ ........................................... B25B 1/10
[52] U.S. Cl. ...................... 29/281.1; 29/281.6; 269/154; 269/285
[58] Field of Search ................................. 29/281.1, 283, 29/DIG. 56, 281.6, 284; 269/285, 43, 136, 154; 312/307, 330.1

[56] References Cited

U.S. PATENT DOCUMENTS

| | | | |
|---|---|---|---|
| 1,385,088 | 7/1921 | Mellor . | |
| 1,811,299 | 6/1931 | Brockhaus, Jr. . | |
| 1,850,178 | 3/1932 | McChesney . | |
| 2,499,124 | 2/1950 | Zipp et al. | 269/285 |
| 2,630,702 | 3/1953 | Pizzani | 72/128 |
| 2,661,783 | 12/1953 | Caston | 269/154 X |
| 2,699,708 | 1/1955 | Fotsch | 90/59 |
| 2,711,904 | 5/1955 | Gartner et al. | 279/157 |
| 2,770,990 | 11/1956 | Rix | 81/38 |
| 2,845,038 | 7/1958 | Crawford | 29/281.1 X |
| 4,098,500 | 7/1978 | Lenz | 269/136 |
| 4,165,869 | 8/1979 | Williams | 269/154 |
| 4,252,304 | 2/1981 | Pettican | 269/154 X |
| 4,529,183 | 7/1985 | Krason et al. | 269/43 |
| 4,569,509 | 2/1986 | Good | 269/136 X |
| 4,664,394 | 5/1987 | Theissig et al. | 279/157 |
| 4,898,371 | 2/1990 | Mills et al. | 269/136 |
| 4,928,937 | 5/1990 | Bernstein | 269/136 |
| 4,934,674 | 6/1990 | Bernstein | 269/154 |
| 5,022,636 | 6/1991 | Swann | 269/154 |
| 5,094,436 | 3/1992 | Stephan, III | 269/153 |
| 5,098,073 | 3/1992 | Lenz | 269/43 |
| 5,242,159 | 9/1993 | Bernstein | 269/32 |
| 5,351,943 | 10/1994 | Milz | 269/246 |
| 5,442,844 | 8/1995 | Swann | 29/281.1 |

FOREIGN PATENT DOCUMENTS

| | | |
|---|---|---|
| 0526432A1 | 7/1992 | European Pat. Off. . |
| 1904673 | 11/1960 | Germany . |
| 562447 | 3/1944 | United Kingdom . |

OTHER PUBLICATIONS

Bi-Lok Tech Package Brochure, Chick Machine Company, 1988.
Chick M-Series Brochure, Chick Machine Tool, Inc., pp. 3,7, and 12, Aug. 1993.
Chick Vise Fixturing Brochure, Chick Machine Tool, Inc., pp. 2, 5, 7 and 8, Aug. 1991.

*Primary Examiner*—Peter Vo
*Assistant Examiner*—Khan V. Nguyen
*Attorney, Agent, or Firm*—Kirkpatrick & Lockhart LLP

[57] ABSTRACT

A shield for use in connection with a workholding apparatus that has a base having a longitudinal slot and at least two jaw members operably supported on the base for selectively clamping a workpiece therebetween. The shield comprises a plate member adapted to be removably received on the base and configured to permit at least one jaw member to move relative thereto. The plate member may be sized to provide the workholding apparatus with a worksurface that is wider than the base, the plate member having an opening to permit movement of the jaw members such that it is completely covered by the cooperation of the jaw members and the plate to prevent debris from entering the longitudinal slot of the base. Alternately, the opening is provided with grooves for slidably guiding a telescoping cover plate which is attached to movable support members and is cooperated with the cover plate to completely cover the longitudinal slot during the clamping operation.

12 Claims, 11 Drawing Sheets

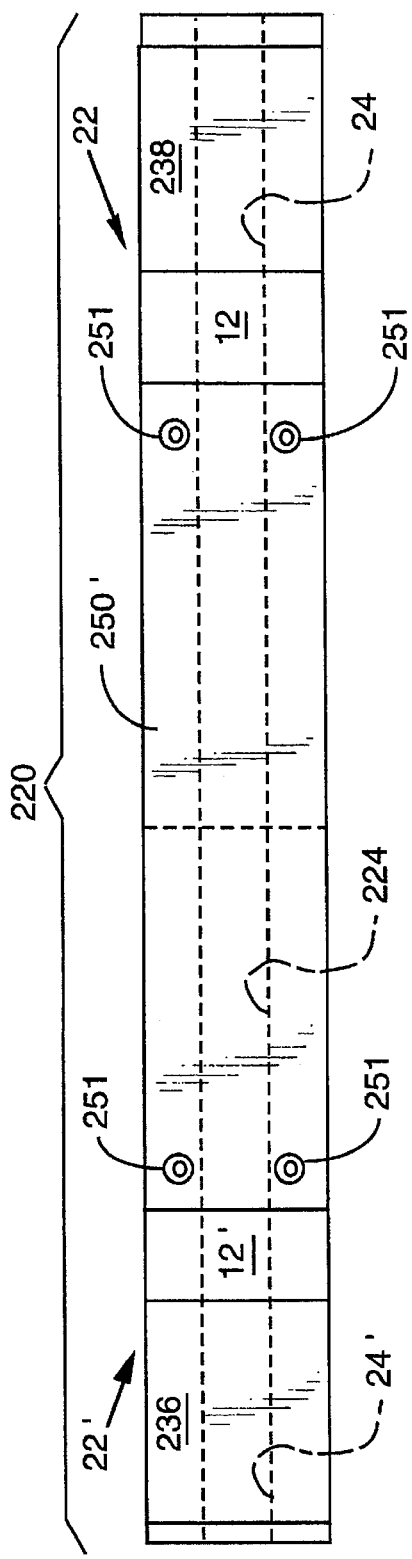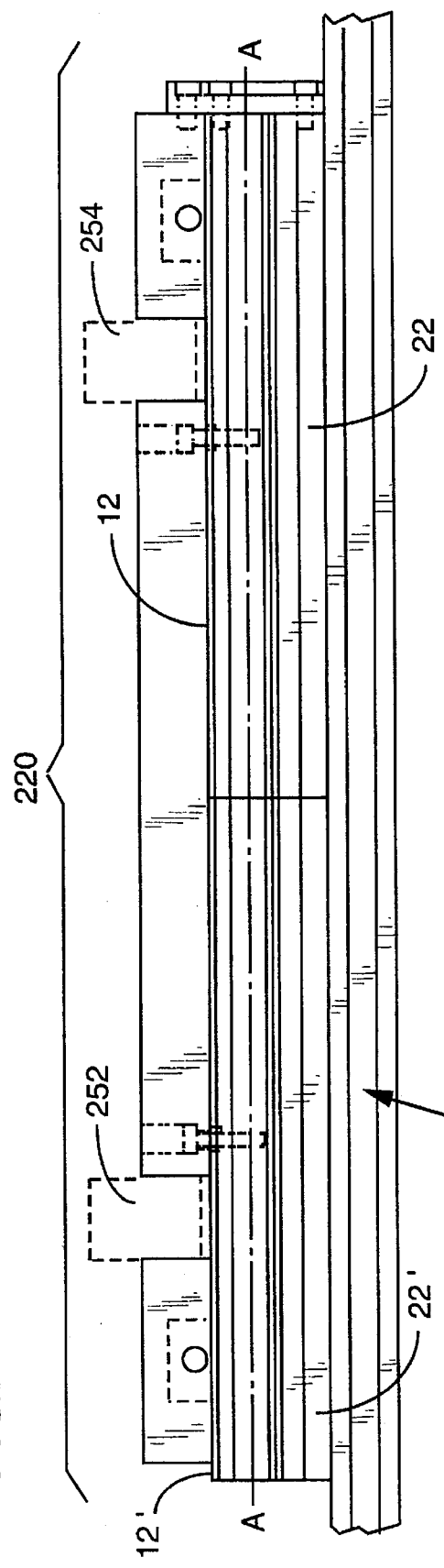

APPARATUS FOR EXPANDING THE WORKSURFACE OF A VISE-LIKE WORKHOLDING APPARATUS

This is a continuation-in-part application of U.S. patent application Ser. No. 08/192,193, filed Feb. 4, 1994, now U.S. Pat. No. 5,442,844, which is a continuation of U.S. patent application Ser. No. 07/998,805, filed Dec. 30, 1992, now abandoned, which was a divisional application of U.S. patent application Ser. No. 07/955,361, filed Oct. 1, 1992, now abandoned.

BACKGROUND OF THE INVENTION

1. Field of the Invention

The present invention relates to workholding apparatuses and, more particularly, is directed to apparatuses for expanding the worksurface of a single precision workholding vise or a collection of precision workholding vises arranged on a common support member.

2. Description of the Invention Background

During the machining of a "workpiece" on a machine tool apparatus such as a milling machine or the like, single or multiple workpieces are typically held in place by a precision vise or clamping member ("a vise-like workholder") that is attached to the machine. Exemplary vise-like workholders that are adapted to hold a single workpiece are disclosed in U.S. Pat. No. 4,928,937 to Bernstein, U.S. Pat. No. 4,898,371 to Mills et al., U.S. Pat. No. 4,569,509 to Good, and U.S. Pat. No. 4,098,500 to Lenz. As can be gleaned from review of those patents, such vise-like workholders are adapted to clamp a workpiece between opposing jaw members operably supported on a base. Typically, one jaw member is fixed and the other jaw member is movable relative to the fixed jaw by means of a screw member housed within the base. As the movable jaw member is moved towards the fixed jaw member, the workpiece is clamped therebetween.

Other vise-like workholders are capable of holding two or more workpieces in side-by-side orientations. Examples of such "two-station" workholders are disclosed in U.S. Pat. No. 5,098,073 to Lenz, U.S. Pat. No. 5,094,436 to Stephan, III, U.S. Pat. No. 5,022,636 to Swann, U.S. Pat. No. 4,934,674 to Bernstein, and U.S. Pat. No. 4,529,183 to Krason et al. Such workholders typically comprise a base that has a central jaw fixed thereto. Two outer jaws are operably supported on the base and can be selectively positioned relative to the fixed central jaw by a vise screw that is operably received in a longitudinal cavity provided in the base.

The workpiece or workpieces are supported on the workholder bases of each of the above-mentioned workholders and are secured in position by at least two jaw members. The portion of the base upon which the workpiece is supported is known as the "worksurface" of the workholder. In many workpiece machining operations, it is desirable to use a workholder that is equipped with jaws and a worksurface that are at least as wide as the workpiece being machined to ensure that the workpiece is adequately supported during the machining operation. Moreover, with the ever increasing use of computer numerically controlled ("CNC") machine tool apparatuses, it is desirable to present as many workpieces as possible to the machining apparatus at a single time to reduce the amount of machine set-up and tool-change time. Thus, it is desirable to secure as many workpieces as practical between each pair of workholding jaws.

However, because the width of the worksurface and the jaws of the above-mentioned workholding vises cannot be "expanded" to accommodate wider workpieces or pluralities of workpieces, the user is forced to inventory a number of various sized workholders. Such workholders may typically cost several hundred dollars and, thus, the average machine owner cannot afford to maintain an extensive inventory of such workholding devices.

The above-mentioned problem has been somewhat addressed in U.S. Pat. No. 4,928,937 to Bernstein which discloses an arrangement of a plurality of workholders in an abutting, side-by-side relationship. Again, however, because the bases and jaw members of such workholding apparatuses cannot be expanded, numerous workholders must be used to accommodate wide or numerous workpieces.

U.S. Pat. No. 2,699,708 to Fotsch also discloses a solution to the above-mentioned problem by providing a machine tool table that has a plurality of T-slots provided therein that are adapted to slidably receive a corresponding number of clamping assemblies. While that arrangement enables a variety of different sizes of workpieces to be clamped in a desired position on the machine tool table, the clamping assemblies cannot be used on other machining apparatuses that are not equipped with a slotted table. Similarly, U.S. Pat. No. 4,898,371 discloses the use of several workholder bases placed side-by-side with a common "long" jaw blank placed therebetween for clamping long workpieces.

All of the above-mentioned workholding apparatuses have further disadvantages. In particular, during the machining of a workpiece, a machine tool is operably advanced into contact with the workpiece to remove a predetermined amount of material therefrom. As the machine tool contacts the workpiece, such removed bits and pieces of material, commonly referred to as "chips", collect on the workholder(s) and often become trapped in exposed slots and openings therein. If those chips are not cleaned from the workholder(s) prior to clamping the next workpiece(s), such chips can become jammed in various moving parts of the workholder(s) and possibly damage those workholder components. Thus, to prevent excessive wear and damage of the workholder components, the workholder(s) must be carefully cleaned and often completely disassembled to remove any chips, dirt or debris trapped therein. All of the aforementioned workholders have an exposed longitudinal slot that is notorious for collecting chips and other dirt and debris therein. Similarly, the T-slots in the work table of U.S. Pat. No. 2,699,708 must be carefully cleaned before the clamping assemblies are slidably inserted therein to permit precise location of the clamping assemblies and to avoid possible damage to those assemblies.

Workholding apparatuses have been designed such that the inner-workings of such apparatuses are substantially enclosed to retard the collection of chips and debris therein. For example, the screw member of the vise disclosed in U.S. Pat. No. 1,385,088 to Mellor is substantially protected from dirt and chips by being enclosed in the vise base. In this workholder design, the movable jaw support member or "nut" is adapted to be slidably positioned on the base by the screw member. However, the surface of the base upon which the support member slides is exposed. Thus, chips can accumulate on that surface and, ultimately, hamper the movement of the jaw support member on the base.

The problem of chip accumulation in the longitudinal slot of a vise-like workholder base has been somewhat addressed in European Patent Application Publication No. 0 526 432 A1, which was filed on Jul. 7, 1992 by CUTER S.p.A of Brescia, Italy. The workholder disclosed in that reference has a base that has a fixed jaw and a movable jaw. The base has a longitudinal slot or "groove" that extends its entire length for receiving a mobile jaw carriage and screw assembly. A series of notches are also provided along portions of the base adjacent to both sides of the groove for engaging a flanged portion of the screw assembly. To retard the infiltration of chips into the groove during machining, interconnected nylon blocks are placed in the groove. However, such blocks can be inadvertently separated from the base and lost during the installation and storage of the workholder. Also, such block assemblies do not prevent chips from collecting in the notches that are adjacent to the longitudinal slot. This patent also teaches the end-to-end attachment of the vise bases to create an elongated workholding member. However, that workholder configuration also has similar chip infiltration problems.

Another workholding apparatus that addresses the aforementioned chip infiltration problem is manufactured by Chick Machine Tool, Inc. of 500 Keystone Drive, Warrendale, Pa. 15086 under the trademarks "Bi-Lok", "Qwik-Lok", and "Multi-Lok". In that workholding device, a series of three overlapping movable cover plates are movably supported in opposing longitudinal grooves that are provided in the base on each side of the longitudinal groove therein. In particular, a "central" cover plate is movably supported in the grooves and movably attached to the movable jaw support members such that it always covers the otherwise exposed portion of the longitudinal slot extending between the movable support members. A second plate member is attached to one of the movable support members and is arranged to overlap the point of attachment wherein the center plate is movably attached to that movable support member. A third plate member is attached to the other movable support member and is arranged to overlap the point of attachment wherein the center plate is attached to that movable support member. Such overlapping arrangement of cover plates trapped within the base serves to completely cover the slot that extends between the movable jaw members. Although such workholder design effectively prevents chips from entering the workholder slot, it has some disadvantages. In particular, because the cover plates are captivated in opposed grooves provided in the workholder base and because the jaw members are movably supported on the top surface of the base, gaps are created between the cover plates and the jaw members. Such gaps are susceptible to the accumulation of chips therein which could hamper the positioning of jaw members on the base. Moreover, the time and tooling required to machine the opposing grooves in the base member increase the costs associated with manufacturing the workholder.

Also, those workholders that have clamping assemblies slidably received in a longitudinal slot provided in the base, are susceptible of having such clamping assemblies inadvertently advanced out of the base and possibly damaged. To prevent such possible damage, stops are typically provided to restrict the travel of the clamping assemblies. Those stops, however, must be removed each time the workholder is cleaned or serviced and, thus, increase the amount of time required to clean the chips that accumulate within the slot.

In view of the foregoing, there is a need for an apparatus that can be used in connection with vise-like workholders to expand the worksurfaces thereof.

There is another need for apparatuses that can be used in connection with multiple vise-like workholders to create a substantially continuous planar worksurface therebetween.

There is still another need for apparatus that can be used with a vise-like workholders that has the abovementioned attributes and also serves to protect the workholder's innerworkings and base member from chips and debris created during the machining process without hampering the workholder's operation.

There is a further need for apparatus that can be used in connection with vise-like workholders that can limit the travel of the workholder's clamping assembly without increasing the amount of time required to disassemble and clean the workholder.

SUMMARY OF THE INVENTION

In accordance with a particular preferred form of the present invention, there is provided a shield for use in connection with a workholder that has a base and at least two jaw members operably supported thereon. The shield comprises a plate member that is removably received on the base between the jaw members and the base and is configured to permit at least one jaw member to move relative thereto. The plate member has a second width that is wider than the first width of the base to provide the workholder with a worksurface that is wider than the workholder's base.

In another embodiment, a shield is provided for use in connection with a workholder that has a base that has a longitudinal axis and a longitudinal cavity having a slot extending along the longitudinal axis. A central jaw member is attached to the base and first and second movable support members are each supported on the base for longitudinal movement along the slot toward and away from the center jaw member. A first jaw member is attached to the first support member and a second jaw member is attached to the second support member. The shield, in a preferred form, comprises a plate member that is removably received on the base between the center, first, and second jaw members and the base. The plate member has a first opening therein for receiving the first support member therein and a second opening for receiving the second support member therein. The plate member is wider than the base and cooperates with the first and second jaw members to substantially completely cover the slot to prevent debris from entering therein.

In yet another embodiment, a workholding system is disclosed. In a preferred form, the workholding system comprises a support member and at least two workholders that each have a base and at least two jaw members operably supported thereon. Each base has a plate member removably received thereon between the jaw members and the base. Each plate member has two longitudinal edges and is configured to permit at least one corresponding jaw member to move relative thereto. Each plate member is wider than the base upon which it is received. Attachment members are provided for attaching the bases of the workholders to the support member such that at least one longitudinal edge of each plate member is in abutting relationship with at least one longitudinal edge of another plate member to create a substantially continuous planar worksurface therebetween.

In another embodiment of the present invention, a shield is provided for use in connection with a workholder that has a base that has a longitudinal axis with longitudinal cavity having a slot extending along the longitudinal axis. The workholder further has a center jaw member that is attached to the base and first and second movable support members that are supported on the base for longitudinal movement along the slot toward and away from the center jaw member. In addition, the workholder has a first jaw member that is attached to the first movable support member and a second jaw member that is attached to the second movable support member. The shield, in a preferred form, comprises a plate member that is removably received on the base between the center, first and second jaw members and the base. The plate member has a slot therein that is adapted to receive the first and second movable support members therein such that the first and second movable support members can be selectively advanced along the slot toward and away from the center jaw member. A longitudinally telescoping cover plate assembly is slidably attached to the plate member and is arranged to span the opening in the plate member and be selectively coextensive therewith. The cover plate assembly has portions attached to the first and second movable support members for travel therewith such that the cover plate assembly, in cooperation with the first and second jaw members, substantially completely covers the slot in the base.

Thus, it is an object of the present invention to provide a relatively inexpensive apparatus that can be used in connection with a vise-like workholder for expanding the workholder's worksurface.

It is another object of the present invention to provide apparatuses that can be used in connection with a plurality of vise-like workholders for creating a substantially continuous planar worksurface therebetween.

Yet another object of the present invention is to provide an apparatus that can be used in connection with vise-like workholders to protect the workholder's inner workings and base member from chips and debris created during the machining process without hampering the workholder's operation.

Further, it is an object of the present invention to provide a means for limiting the longitudinal movement of the movable clamping members of a precision vise-like workholder to eliminate the need for auxiliary screw and to facilitate cleaning of the workholder by allowing for easy disassembly.

Accordingly, the present invention provides solutions to the problems discussed above. In particular, the present shield member can be removably attached to the base of a vise-like workholder to expand the worksurface thereof. The present shield member is much less costly to manufacture and easier to store than the workholders themselves. Thus, it is much more economically feasible for the machine user to store a number of the present shield members of various widths to provide the owner with the capability of machining various sizes and numbers of workpieces on a "standard" sized workholder. In addition, the subject shield member can be used with a plurality of workholders arranged to create a substantially continuous planar worksurface therebetween. Such workholding arrangement permits a relatively small number of "standard" workholders to be used to create a vise-like workholding system capable of holding numerous or relatively large, odd shaped workpieces in a precise location relative to a machine tool apparatus. The subject shield member also serves to prevent the infiltration of chips into the workholder base while protecting the base and the inner-workings of the workholder against accidental damage. Therefore, the subject shield member addresses a number of problems commonly encountered when using other known workholders. However, these and other details, objects and advantages will become further apparent as the following detailed description of the present preferred embodiment thereof proceeds.

BRIEF DESCRIPTION OF THE DRAWINGS

In the accompanying drawings, there is shown present preferred embodiments of the invention wherein like reference numerals are employed to designate like parts and wherein:

FIG. 11 is a side elevational view of another preferred workholder assembly of the present invention attached to a support plate;

FIG. 12 is a plan view of the workholder assembly of FIG. 11;

DETAILED DESCRIPTION OF PREFERRED EMBODIMENTS

Figure 1:
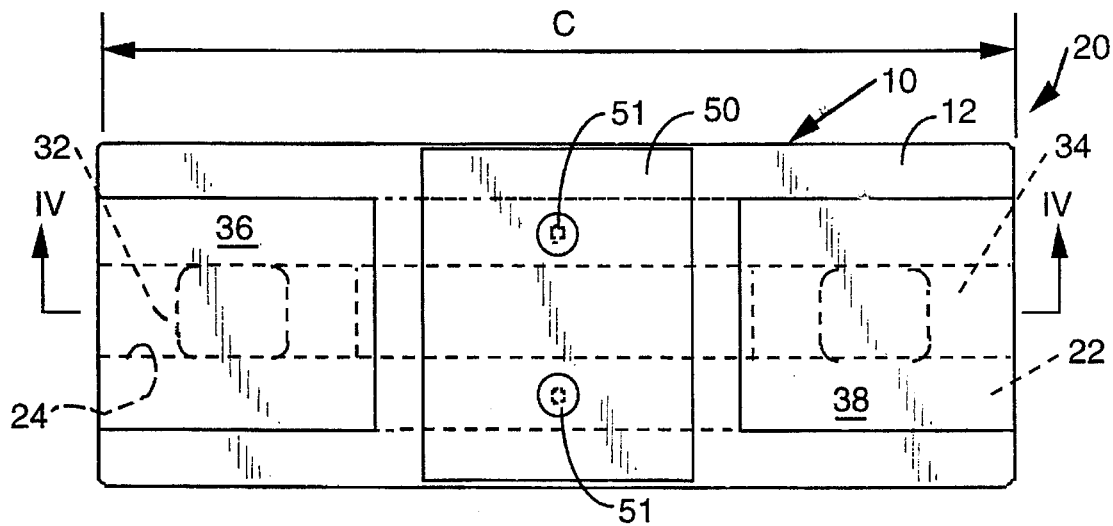
FIG. 1 is a plan view of a preferred shield member of the present invention installed on a vise-like workholder.
Figure 2:
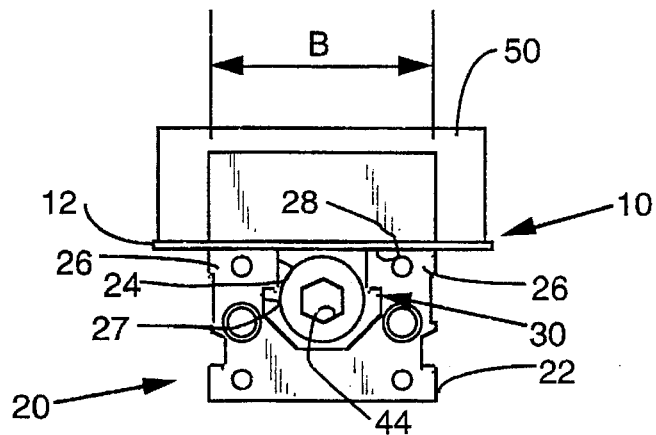
FIG. 2 is an end elevational view of the shield member and vise-like workholder assembly depicted in FIG. 1.

Referring now to the drawings for the purposes of illustrating present preferred embodiments of the invention only and not for purposes of limiting the same, FIGS. 1 and 2 illustrate a preferred shield member 10 of the present invention received on the base 22 of a vise-like workholder 20. The basic structure of the workholder 20 is similar to the workholding apparatus described in my U.S. Pat. No. 5,022,636, issued Jun. 11, 1991, entitled "Workholding Apparatus", the disclosure of which is herein incorporated by reference. As such, in the present "Detailed Description Of Preferred Embodiments", the basic structure of the workholder 20 will be described in general terms, it being understood that the particular details of the workholder 20 construction, with the exception of those features which are described hereinbelow forming these embodiments of the present invention, may be gleaned from a review of that patent. In addition, the skilled artisan will readily appreciate that the workholders described herein are provided as examples of the types of workholders with which the shield member embodiments of the present invention may be used. As such, the particular construction of the workholders described herein should not be construed to limit the breadth of protection afforded to the present shield member embodiments described herein and recited in the appended claims.

Figure 3:
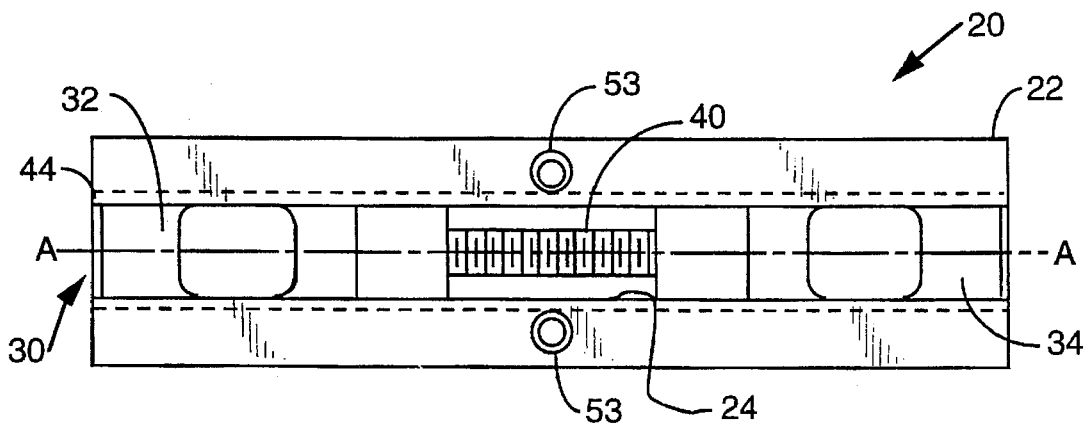
FIG. 3 is a plan view of the workholder of FIGS. 1 and 2 with the shield member removed therefrom.
Figure 4:
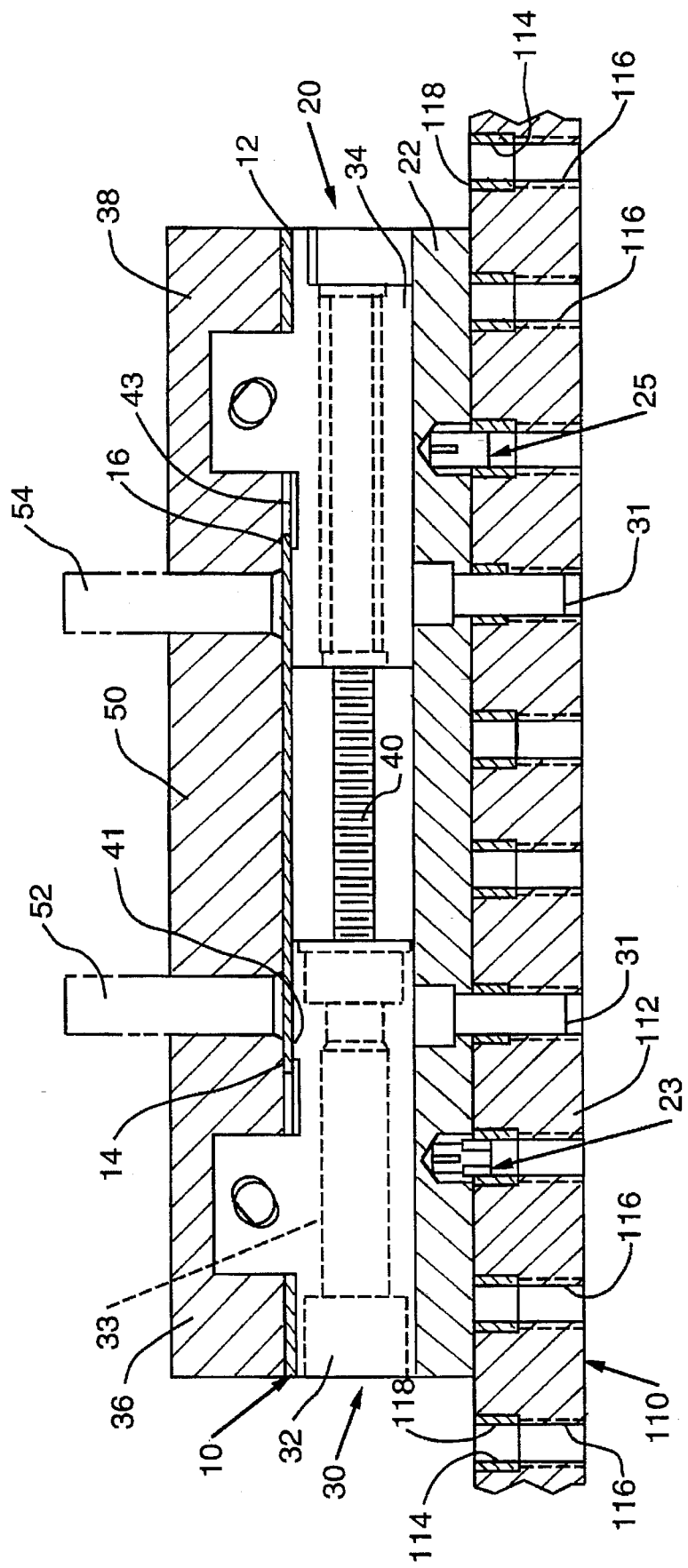
FIG. 4 is a partial cross-sectional elevational view of the workholder of FIGS. 1-3 taken along line IV—IV in FIG. 1, with some elements shown in full view for clarity.

The vise-like workholder 20 generally comprises a base member 22 which is an elongated metallic structure typically fabricated from a high strength aluminum material. As can be seen from reference to FIGS. 2 and 3, a cavity 27 is machined along the longitudinal axis "A—A" of the base member 22 and defines a longitudinal slot 24 having two longitudinally extending side rail members 26. In addition, a free-floating clamping assembly, generally designated as 30, is provided for movement within the cavity 27 in the base member 22. The clamping assembly 30 includes a first movable support member 32 and a second movable support member 34 which are each slidably received within the cavity 27. As shown in FIG. 4, a first jaw member 36 is preferably removably attached to the first movable support member 32 and a second jaw member 38 is preferably removably attached to the second movable support member 34. The jaw members (36, 38) may be similar to those workholding jaw portions disclosed in U.S. Pat. No. 5,025,427 entitled "Quick Change Head For Precision Machine Vise" the disclosure of which is also herein incorporated by reference.

The clamping assembly 30 also includes a screw shaft 40 that is received within the cavity 27 in the base member 22. One end of the screw shaft 40 is provided with threads 42 which are intended to engage a threaded bore 33 within the first movable support member 32. See FIG. 4. In addition, the screw shaft 40 includes means (not shown) for engaging and displacing the secondary movable support member 34. The screw shaft 40 passes through the second movable support member 34 while the other end of the screw shaft 40 has a socket 44 .therein for receiving rotary selectively providing rotary motion to the screw shaft 40.

A "first" center jaw member 50 is also attached to the base 22 between the first and second movable support members (32, 34) preferably by capscrews 51. In particular, threaded bores (not shown) are provided in the rails 26 of base 22 for receiving the capscrews 51 therein. Preferably, bushings 53 are attached to base 22 such that one bushing 53 is coaxial with a corresponding threaded bore adapted to receive a capscrew 51. The first center jaw member 50 may preferably be attached to base 22 by the method and apparatus taught in my U.S. patent application Ser. No. 07/955,361, a parent application hereto or by the apparatus and method disclosed in a co-pending U.S. patent application Ser. No. 08/300,375, entitled "Apparatus For Positioning An Element On A Surface," filed on Sep. 2, 1994, and owned by the owner of the present application, the disclosure of which is also herein incorporated by reference. However, other precise fastening methods may also be used to attach the first central jaw member 50 to the base 22.

As can be seen in FIG. 4, the first center jaw member 50 is arranged on base 22 such that the first and second movable support members (32, 34) may move toward and away from the center jaw member 50 to cause, for example, workpieces 52 and 54 to be clamped between the first center jaw member 50 and first and second jaw members (36, 38). For example, when the screw shaft 40 is rotated, the first movable support member 32 is moved relative to the first center jaw member 50, thereby causing the first jaw member 36 to move toward the first center jaw member 50 to clamp a first workpiece 52 therebetween. In addition, the rotation of the screw shaft 40 and its movement relative to the first movable support member 32 causes the second movable support member 34 to move toward the first center jaw member 50 to engage and restrain a second workpiece 54 therebetween.

As can be seen in FIG. 2, the rails 26 of the workholder base 22 define a planar worksurface (that has a slot 24 extending the length thereof), generally designated as 28. As can be further seen in FIG. 2, the worksurface 28 has a "first" width generally represented by distance "B". The worksurface 28 also has "first" length, generally represented by distance "C".

Figure 5:
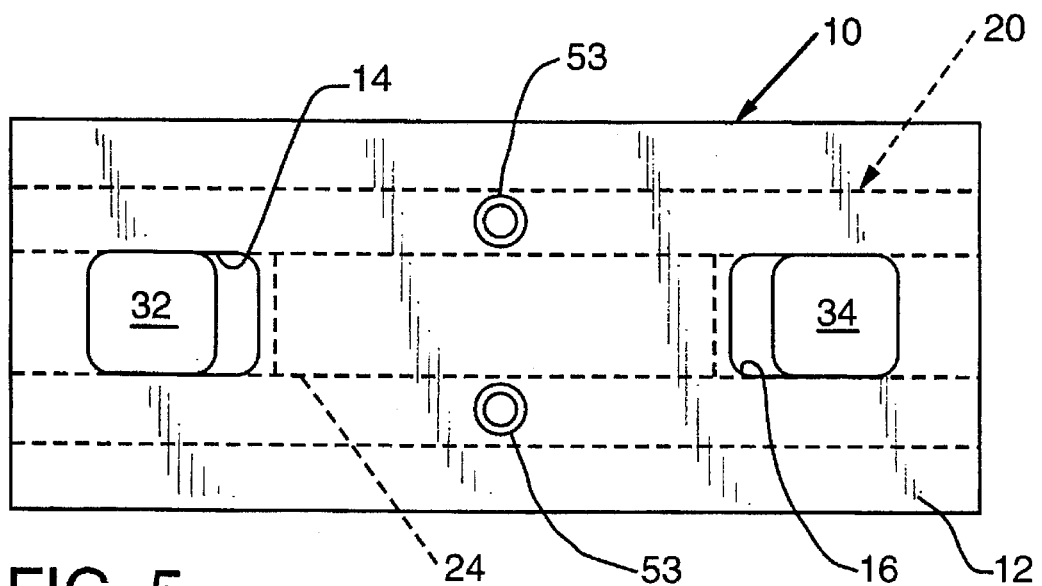
FIG. 5 is a plan view of the workholder and shield member of FIGS. 1-4 with the first and second jaw members removed therefrom for clarity.
Figure 6:
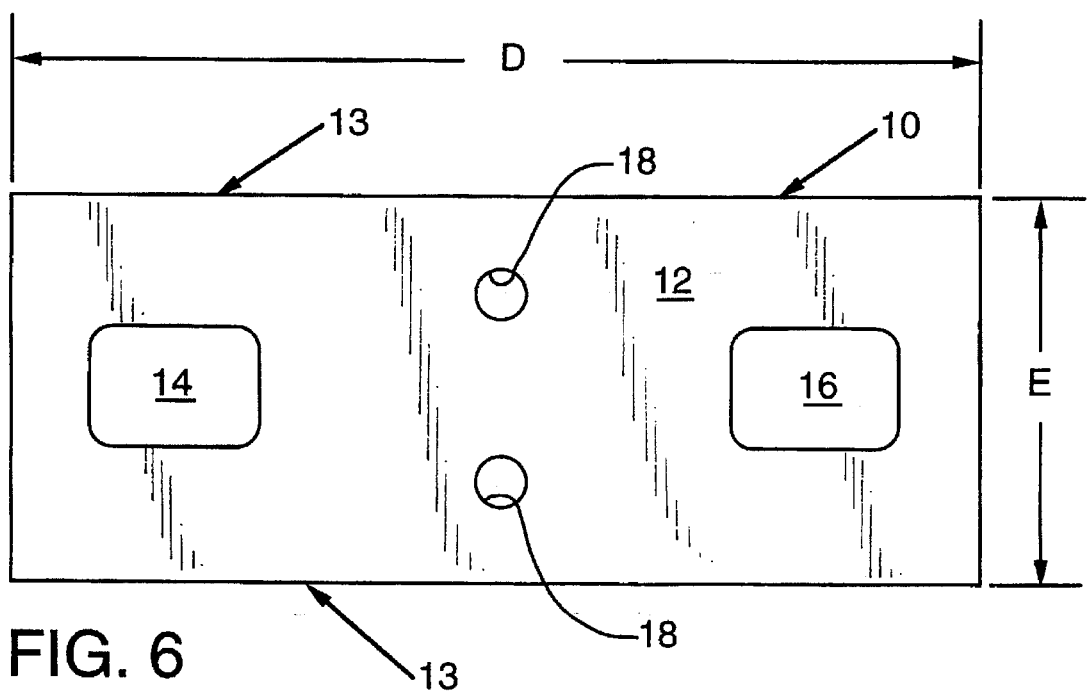
FIG. 6 is a plan view of a preferred shield member of the present invention.

A preferred shield member 10 of the present invention is shown in FIGS. 5 and 6. The shield member 10 comprises a plate member 12 that is preferably fabricated from high strength tool steel; however, other materials may also be successfully used. As can be seen from FIG. 6, the plate member 12 preferably has a "second" length "D" and a "second" width "E". Preferably, second length "D" is substantially equivalent to first length "C"; however, in those applications wherein it is advantageous to elongate the worksurface 28 of the workholder 20, the skilled artisan will appreciate from a further reading of the present Detailed Description Of Preferred Embodiments, that the worksurface 28 can be effectively elongated to a predetermined size by providing the plate member 12 with a second length "D" that is greater than the first length "C".

The plate member 12 is preferably designed to be removably received on the base 22 and is sized such that its second width "E" is wider than the first width "B" of the worksurface 28 of the base 22. It will also be appreciated that the width "E" of the plate member 12 can be made to form a worksurface of any predetermined width. To facilitate the mounting of the plate member 12 on the base 22, the plate member is provided with two longitudinal openings 14 and 16 adapted to movably receive therein the first and second movable support members (32, 34). More specifically, as can be seen in FIG. 5, the first opening 14 is adapted to movably receive the first movable support member 32 and the second opening 16 is sized to movably receive the second movable support member 34. Also, in this embodiment, the plate member 12 has bores 18 therein that are adapted to receive locating bushings 53 that are mounted in the rails 26 for receiving cap screws 51 therein to locate and removably attach the center jaw 50 to the base 22. The skilled artisan will appreciate that, for those vise-like workholders than only have one movable support member and a single fixed jaw, the plate member 12 is preferably fabricated with a single opening adapted to receive the singular movable support member therein.

In this embodiment, the first and second openings (14, 16) are sized such that the first and second movable support members (32, 34), respectively, may freely move therein along the slot 24. In addition, openings (14, 16) are preferably sized to provide the first and second movable support members (32, 34), respectively, with predetermined ranges of axial travel along the longitudinal axis A—A of the slot 24. In a preferred embodiment, the first and second openings (14, 16) are sized relative to the size of the first and second jaw members (36, 38) such that the first and second openings (14, 16) are always covered by the corresponding first and second jaw member (36, 38) regardless of the longitudinal position of the primary and secondary movable slide members (32, 34) within the corresponding first and second openings (14, 16). Thus, it will be appreciated that the plate member 12, in cooperation with the first and second jaw members (36, 38), serve to substantially completely cover the slot 24 to prevent chips, dirt and other debris created by the machining process (collectively "foreign matter") from entering therein. It will be further appreciated that the plate member 12, by virtue of being wider than the base 22, serves to effectively increase the worksurface 28 of the workholder 20. The reader will also appreciate that when plate member 12 is received on the base 22 as shown in FIG. 5, the plate member, by virtue of being removably retained on the base, serves to prevent the slide assembly 30 from being accidentally advanced out of slot 24. Also, as shown in FIG. 1, the first center jaw member 50 can be made as wide as width "E" of the plate member 12. The skilled artisan will also appreciate that first and second jaw members (36, 38) can also be fabricated with widths that equal width "E" or with other widths that are greater than width "B" of base 22. Thus, the machine operator can inventory various shield members 10 and jaw members (36, 38) that are sized for supporting particular workpieces during machining without having to inventory various sizes of complete workholders.

As can also be appreciated from the foregoing, the shield member 10 of the present invention can be used to create a workholding system that comprises a plurality of workholding apparatuses that have a substantially continuous planar worksurface extending therebetween. More particularly and with reference to FIGS. 7-9, there is shown a workholding system, generally designated as 100, that comprises a support member 110 that has a plurality of vise-like workholders 20 attached thereto such that the longitudinal axes "A—A" of the workholders 20 are substantially parallel to each other and the plate members 12 received thereon are arranged in abutting relationship to create a substantially continuous planar work surface, generally designated as 128, therebetween.

Preferably, the support member 110 comprises a planar support plate 112 that has a plurality of bores 114 therein arranged in a predetermined array of orthogonally arranged rows and columns. Support or "tooling" plates of this type are known in the art and, therefore, will not be discussed in great detail herein. As can be seen in FIG. 4, each bore 114 preferably has a lower threaded portion 116 and a locating bushing 118 pressed therein that is fabricated from hardened tool steel. The base 22 of each workholder 20 is provided with a pair of removably attachable locating pins (23, 25) such as those manufactured by Chick Machine Tool, Inc., that extend from the bottom surface thereof and are capable of being inserted into any of two corresponding bushings 118 in the support plate 112 to precisely locate the workholder base 22 on the support plate 112. Both of the locating pins (23, 25) may be round or one pin may be provided with a "diamond" shape in a manner known in the art. It will be appreciated that when the locating pins (23, 25) engage locating bushings 118 in corresponding bores 114 on plate 112, the base 22 of the workholder 20 will be precisely located on the plate 112 in a predetermined position.

Figure 7:
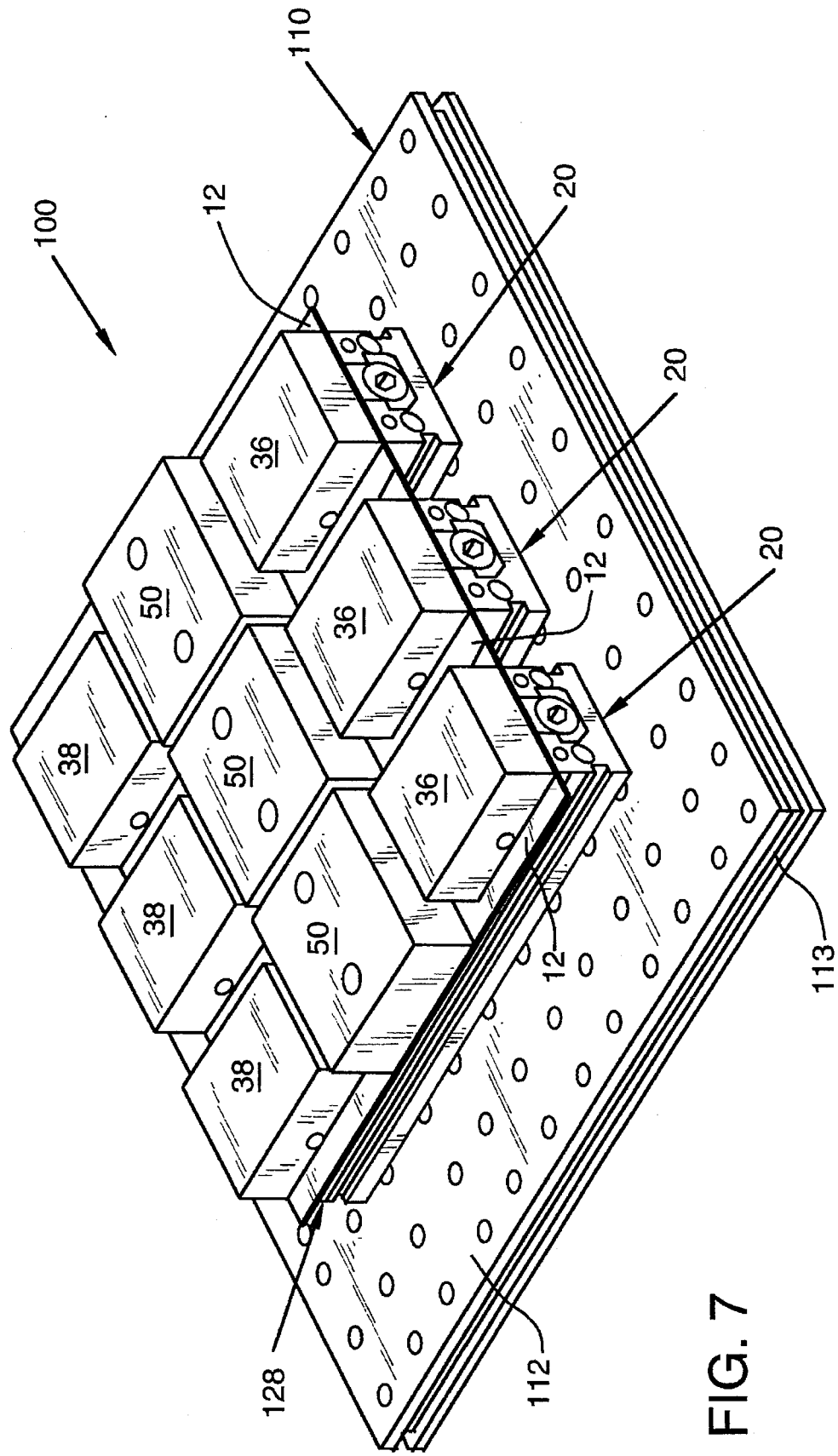
FIG. 7 is a perspective view of a preferred assembly of vise-like workholders of the present invention.
Figure 9:
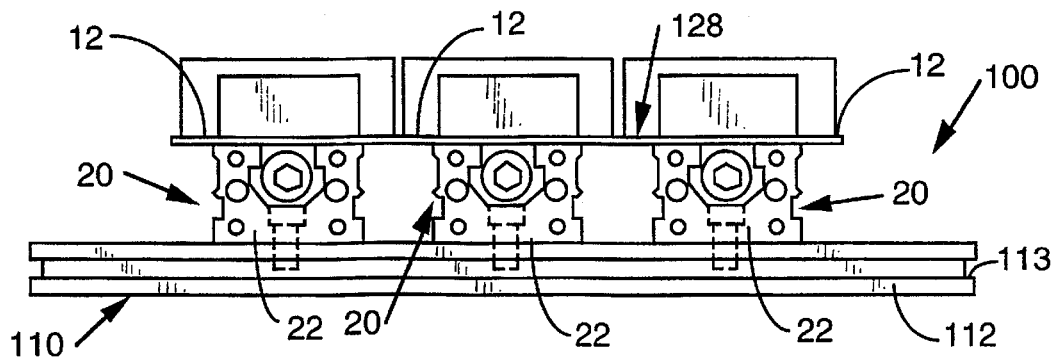
FIG. 9 is an end elevational view of the workholder assembly of FIGS. 7 and 8.

In this embodiment, the base 22 of each workholder 20 is attached to the plate 112 by cap screws 31 that extend through holes 29 in the base to threadedly engage the threaded portion 116 of corresponding bores 114. See FIG. 4. The skilled artisan will appreciate that each base 22 of a workholder 20 can be attached to a support plate or other member in a precise relationship to one another by a myriad of other known locating and fastening methods and apparatus without departing from the spirit and scope of the present invention. For example, the apparatus disclosed in the copending U.S. patent application entitled "Apparatus for Positioning An Element On A Surface", Ser. No. 08/300, 375 that was mentioned above and herein incorporated by reference may also be successfully used to attached the bases 22 of the workholders 20 to a support plate 112 in predetermined orientations. Also, as can be seen in FIGS. 7 and 9, the outer perimeter of plate 112 preferably has a perimetrical groove 113 therein for receiving commercially available clamping members for attaching the plate 112 to a machine tool apparatus. However, other known fastening methods may also be used to attach the support plate 112 to a machine tool apparatus in a predetermined location.

Figure 8:
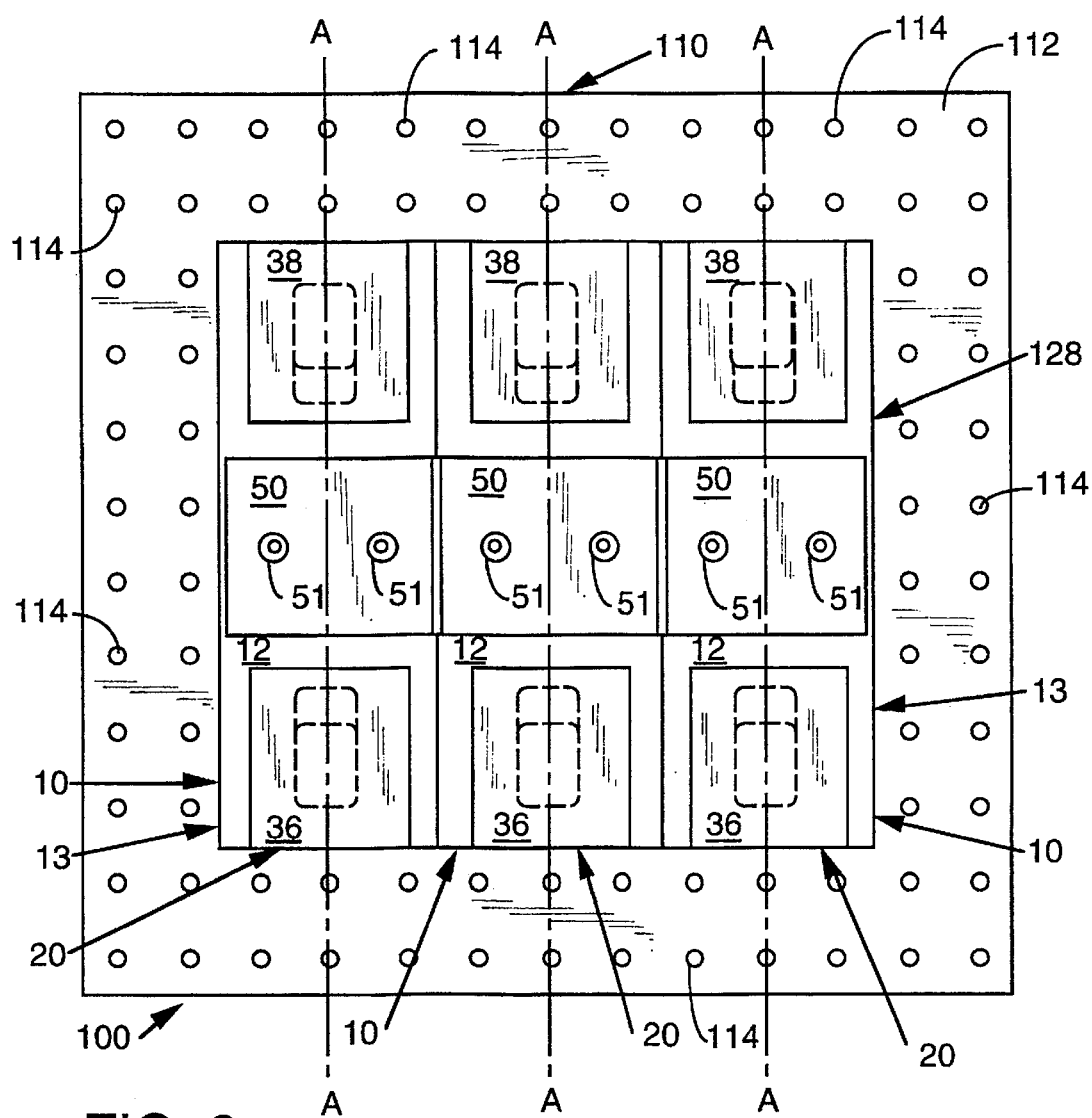
FIG. 8 is a plan view of the workholder assembly of FIG. 7.
Figure 10:
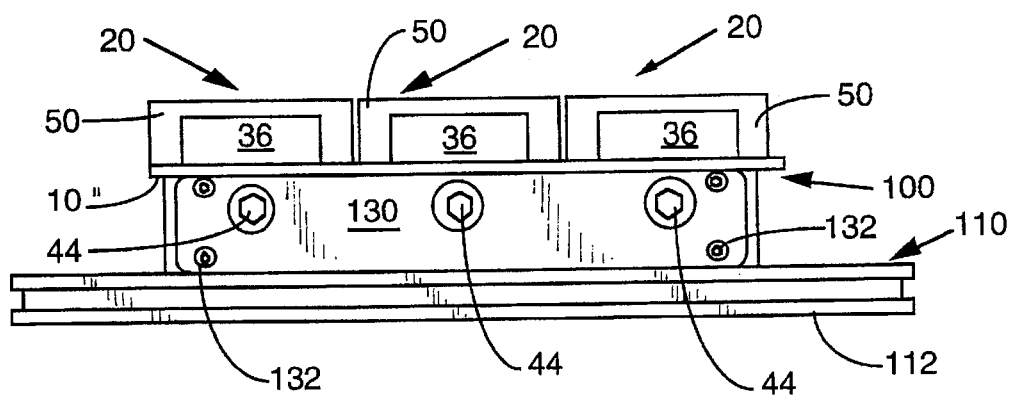
FIG. 10 is an end elevational view of a workholder assembly having a single shield member of the present invention thereon and having a preferred endcap attached thereto.

By way of example, FIGS. 7-9 illustrate a workholding system 100 that is comprised of 3 workholders 20 that are each equipped with a shield member 10 of the present invention. As can be most particularly seen in those Figures, the workholders 20 are located and attached to the support plate 112 by using one of the above-described attachment methods such that the longitudinal axes A—A of the workholders 20 are substantially parallel to each other and at least one of the longitudinal edges 13 (See FIG. 6) of each plate member 12 is in abutting relationship with at least one other longitudinal edge 13 of another adjacent plate member 12. It will be appreciated that the collection of abutting plate members 12 serves to create a substantially continuous and planar worksurface, generally designated as 128, between the workholders 20. It will be further appreciated that the first and second jaw members (36, 38) of each workholder 20 may be provided in various sizes and shapes suited to the shape of the workpiece(s) to be machined. It will be still further appreciated that the substantially continuous planar worksurface 128 also serves to prevent foreign matter from collecting between the adjacent workholders 20. In addition, those of ordinary skill in the art will appreciate that a single shield member 10" may be provided to create a substantially continuous worksurface between the bases. See FIG. 10. Also, to further prevent foreign material from entering the space between adjacent workholders 20, endcap members 130 may be attached to the ends of the workholders 20 by capscrews 132 in the manner illustrated in FIG. 10.

In other embodiments, illustrated in FIGS. 11-14, two or more workholder bases (22, 22') may be attached to a support plate 112 to create one elongated workholder 220. FIG. 11 and 12 illustrate an elongated workholder 220 that comprises two workholder bases (22, 22') attached to a support plate 112 in the manner described above. As can be seen in FIG. 11, the bases (22, 22') are attached to the support plate 112 such that they are in abutting relationship and their longitudinal axes "A—A" are substantially coaxially aligned. Thus, in this embodiment, the slots (24, 24') in each base (22, 22') combine to create one elongated continuous slot, generally designated as 224. The elongated workholder 220 further comprises an elongated clamping assembly 230 sized to be received in the slot 224. The clamping assembly 230 comprises a screw shaft 240 that has a threaded portion 242 that is intended to engage a threaded bore 233 within a first movable support member 232. In addition, the screw shaft 240 includes means (not shown) for engaging and displacing a second movable support member 234. The screw shaft 240 passes through the second movable support member 234 while the other end of the screw shaft 240 preferably provides a receptacle 244 for receiving rotary motion which is selectively provided to the screw shaft 240.

A center fixed "first" jaw member 250 is also attached to the bases (22, 22') by four capscrews 251 between the first and second movable support members (232, 234) which are like first and second movable support members 32 and 34. When the screw shaft 240 is rotated, the first movable support member 232 is moved relative to the center jaw member 250, thereby causing the first jaw member 236 (like jaw member 36) to move toward the first jaw member 250 to clamp a first workpiece 252 therebetween. In addition, the rotation of the screw shaft 240 and its movement relative to the first movable support member 232 causes the second movable support member 234 to move second jaw member 238 (like jaw member 38) toward the first jaw member 250 to engage and restrain a second workpiece 254 therebetween.

The skilled artisan will appreciate that the jaw members (236, 238, 250) can be provided in various other configurations suited to the particular workpieces(s) to be machined. For example, in FIG. 14, the first and second jaws (236, 238) each have a ledge (237, 239) formed therein that is adapted to engage the edges of one continuous workpiece 255. In that embodiment, the center jaw member 250 is sized such that the workpiece 255 is supported thereon.

Figure 14A:
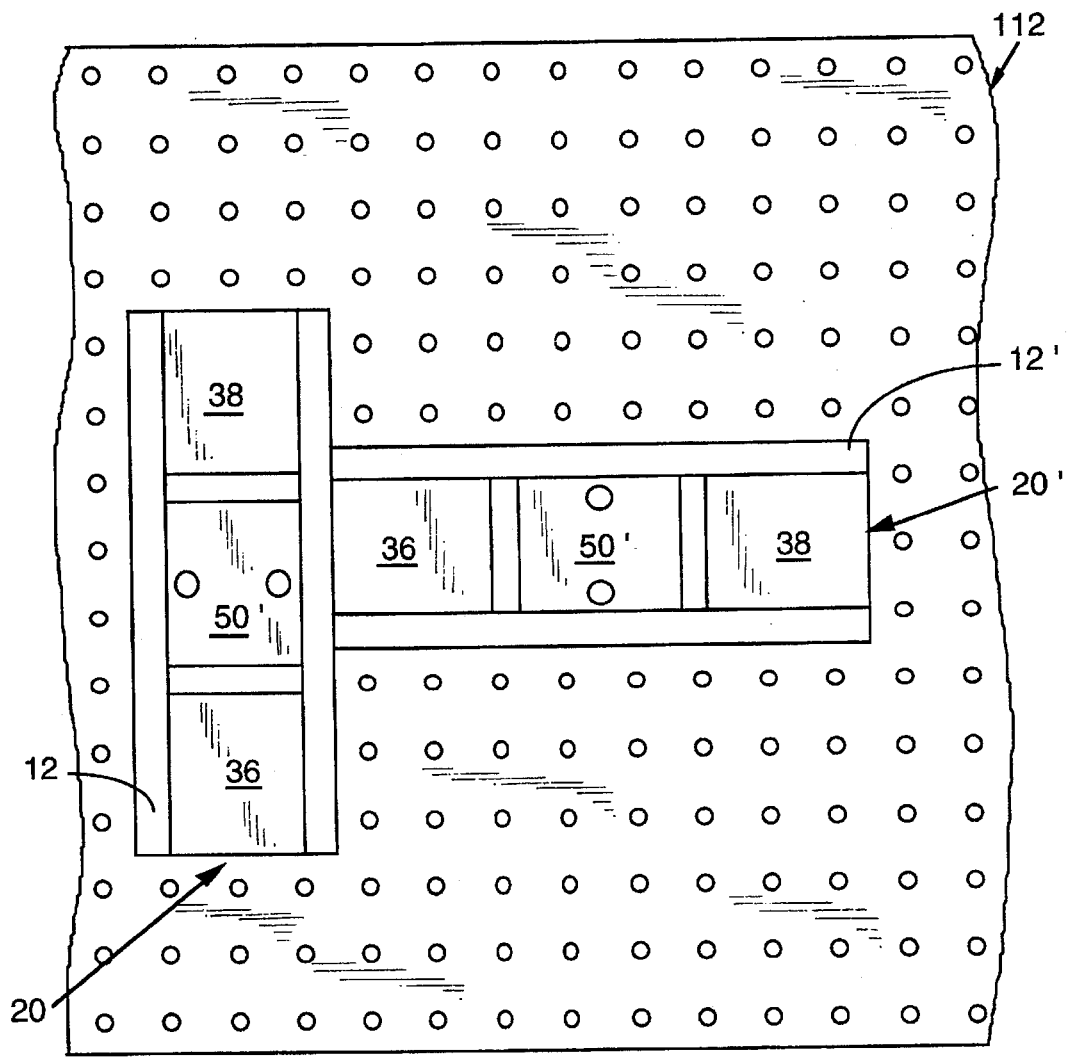
FIG. 14A is a plan view of another workholder assembly of the present invention.
Figure 13:
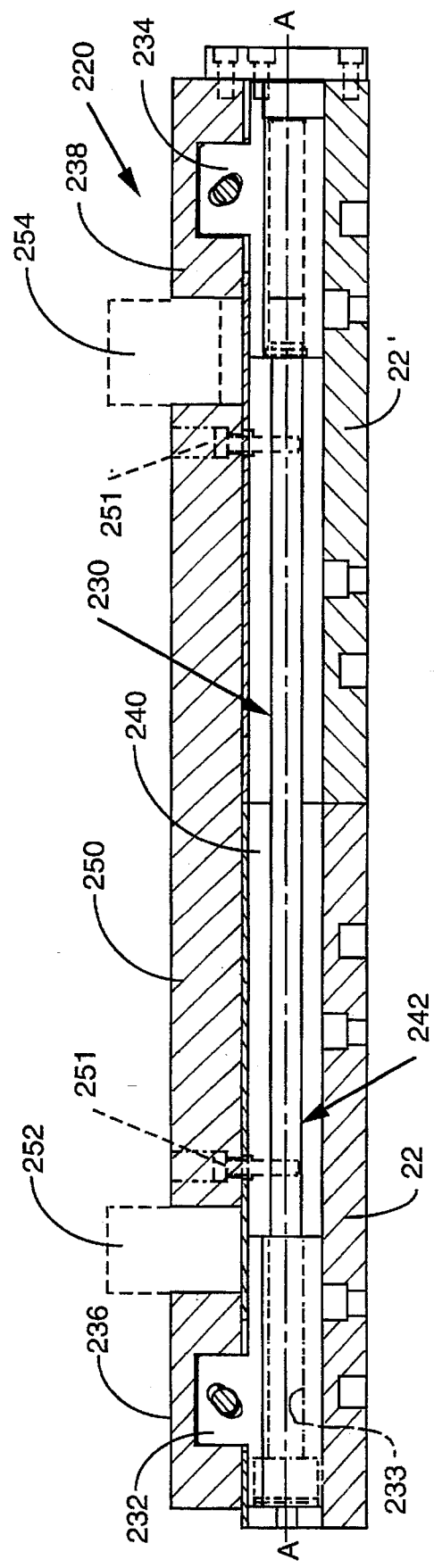
FIG. 13 is a cross-sectional elevational view of the workholder assembly depicted in FIGS. 11 and 12 taken along line XIII—XIII in FIG. 12 with some of the elements thereof shown in full view for clarity.
Figure 15:
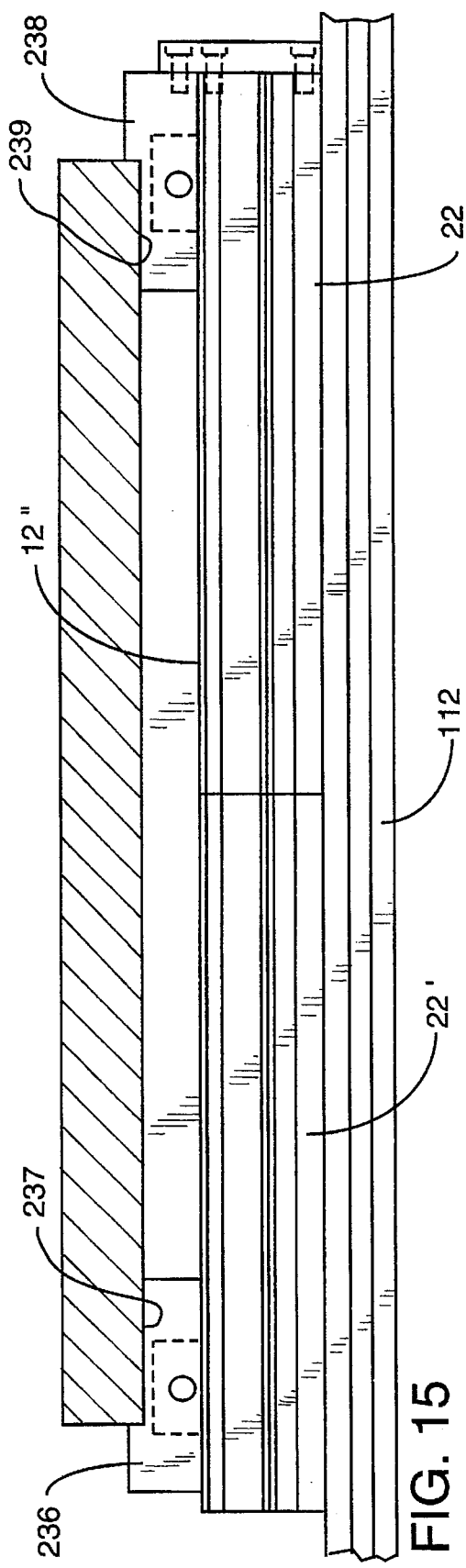
FIG. 15 is a side elevational view of yet another workholder assembly of the present invention.
Figure 14:
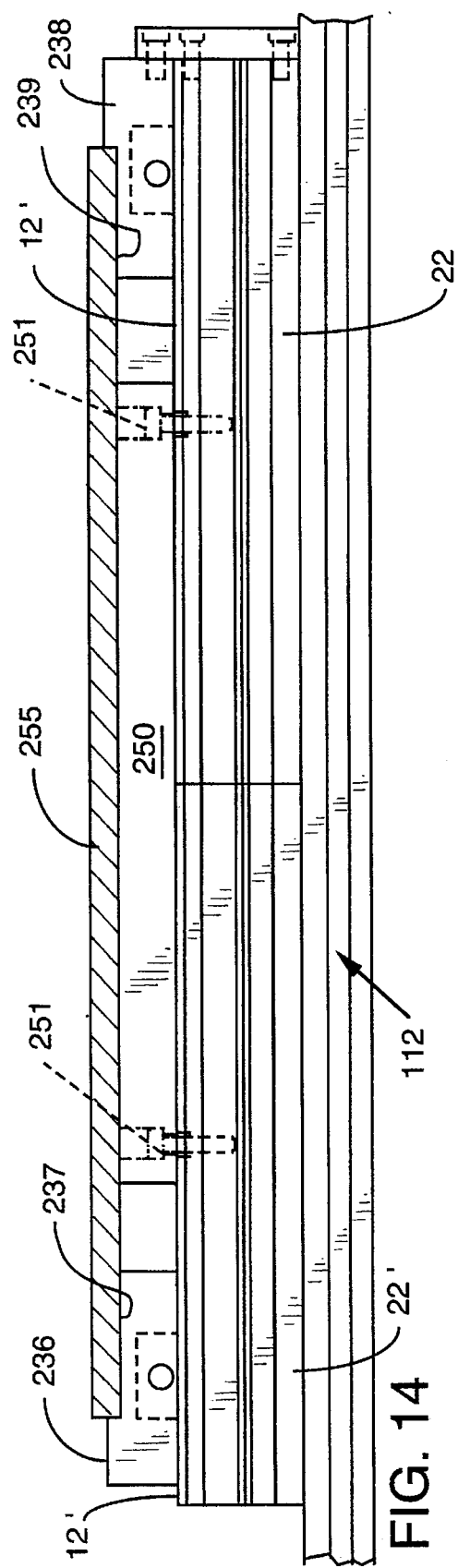
FIG. 14 is a side elevational view of another workholder assembly of the present invention.

FIG. 14 further illustrates the flexibility of this embodiment of the present invention. As can be seen in that Figure, the center jaw 250 has been omitted. The plate member 12 is fabricated without the opening 14 normally provided therein for a secondary movable support member 34 and the plate 12' is fabricated without opening 14 normally provided therein for a movable support member 32. Such arrangement of plates (12, 12') serves to create a substantially continuous worksurface 228 that extends the entire length of workholder 220. As illustrated in FIG. 15, a single plate member 12" may be provided that is configured to be received on both workholder bases (22, 22') to create a continuous worksurface therebetween. The skilled artisan will further appreciate that plates (12, 12') may be fabricated with widths that are equal to the widths of the corresponding bases (22, 22') or plates (12, 12') may be provided with widths that are wider than bases (22, 22') in the manner disclosed above. The reader will also understand that elongated workholders 220 can be fabricated to any desired length by adding additional bases and providing a correspondingly sized clamping assembly and appropriately constructed shield members. In addition, the elongated workholders 220 and the plates (12, 12') thereof can be fabricated and attached to a correspondingly sized support plate 112 to create a workholding system in the manner described hereinabove.

FIG. 14A illustrates two workholders (20, 20') that are attached to a support plate 12 such that the longitudinal axes "A—A" thereof are substantially perpendicular to each other. Such Figure further illustrates the flexibility of the present invention.

Figure 16:
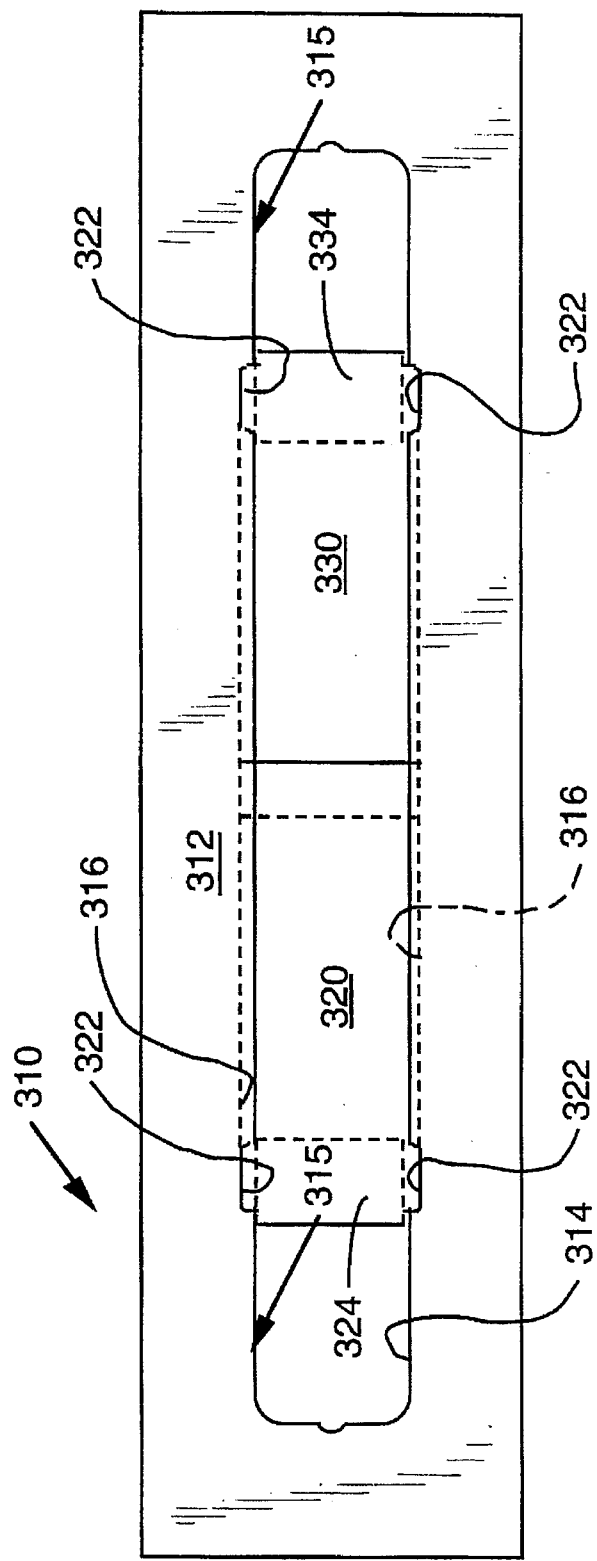
FIG. 16 is a plan view of another preferred shield member of the present invention.
Figure 17:
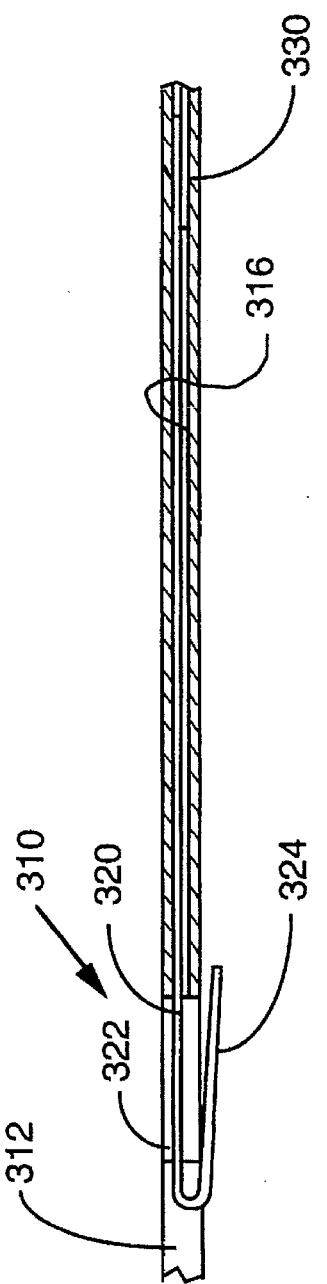
FIG. 17 is a partial cross-sectional assembly view of the cover plates and shield member depicted in FIG. 16 with the cover plates shown in full view for clarity.
Figure 18:
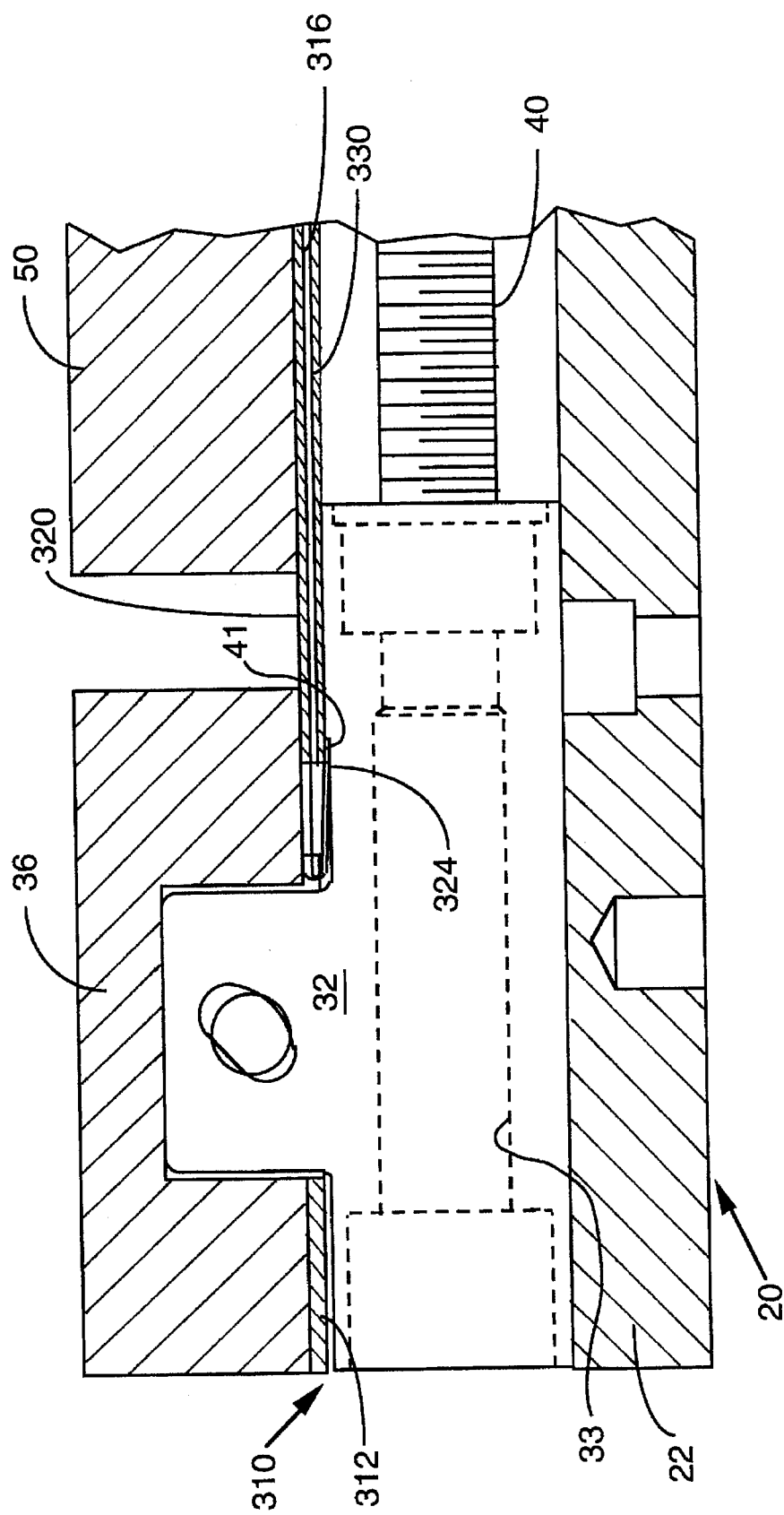
FIG. 18 is a partial cross-sectional elevational view of the shield member of FIGS. 16 and 17 removably received on the base of a workholder.

In another embodiment of the present invention, as illustrated in FIGS. 16-18, a shield member 310 that comprises a plate member 312 that is sized to be removably received on the base 22 of a workholder 20 is disclosed. In a preferred form, plate 312 has an elongated slot 314 that overlies slot 24 in the workholder base 22. On each longitudinal side 315 of slot 314, opposing grooves 316 are provided. Slidably received within opposing grooves 316 are two overlapping cover plates (320, 330) preferably fabricated from, for example, stainless steel or spring steel. To permit cover plates (320, 330) to be slidably inserted into the grooves 316, notches 322 are provided in sides 315 as shown in FIG. 16. The reader will appreciate that cover plates (320, 330) can slidably longitudinally telescope to cover the portion of slot 24 in the base 22 that is not occupied by first and second movable support members (32, 34). More particularly, cover plate 320 is preferably provided with a hook-shaped forward portion 324 that is adapted to engage a ledge 41 machined in first movable support member 32. See FIG. 18. The reader will appreciate that cover plate 330 is also preferably provided with a hook-shaped portion 334 (See FIG. 16) that is adapted to engage ledge 43 formed in the second movable support member 34 (See FIG. 4) in the same manner as depicted in FIG. 18. While this method of attaching cover plates (320, 330) to first and second movable support members (32, 34), respectively, is preferred, other attachment methods may also be successfully used. It will be understood, therefore, that cover plates (320, 330) are longitudinally slidably displaced within grooves 316 in plate member 312 in response to the movement of the first and second movable support members (32, 34) within the slot 24. It will be further understood that the cover plates (320, 330) are preferably sized such that they serve to cooperate with first and second jaw members (36, 38) to completely cover the slot 24 regardless of where the first and second jaw members (36, 38) are located on the base 22. Thus, this embodiment of the present invention serves to prevent foreign material from entering the slot 24 during the machining process. Also, as with the other shield member embodiments disclosed hereinabove, plate 312 can be fabricated with a width that is wider than the width of the base 22 to effectively increase the worksurface thereof.

Accordingly, the present invention provides solutions to the aforementioned problems associated with vise-like workholding apparatuses. The present invention provides a relatively inexpensive means for expanding the worksurface of a vise-like workholder. The present invention further provides a means for limiting the longitudinal movement of the clamping members of a workholding vise while also affording protection from foreign objects to the vise's base and inner workings. In addition, the present invention provides a means for creating a substantially continuous worksurface between a plurality of like-constructed workholders attached to a support member. While such advantages are apparent from the foregoing disclosure, it will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A shield for use in connection with a workholding apparatus for clamping a workpiece, said apparatus has a base having a longitudinal axis and two spaced lateral sides substantially parallel to said longitudinal axis, said base having a maximum first overall width transverse to said longitudinal axis and a longitudinally extending cavity therein, said base further having at least first and second jaw members operably supported on the base such that one of said jaw members is selectively movable along said longitudinal axis relative to the other of said jaw members for selectively clamping a workpiece therebetween, the shield comprising a plate member removably received on the base between the base and said movable jaw members, said plate member having means therein for permitting said movable jaw members to move in a predetermined distance along the longitudinal axis relative thereto, such that, said plate member and movable jaw members completely covering said longitudinally extending cavity during the clamping operation, said plate member having a second width transverse to said longitudinal axis that is wider than the first width of the base such that said plate member extends beyond at least one said lateral side of said base when it is received thereon.

2. The shield of claim 1 wherein said longitudinally extending cavity comprises a longitudinal slot extending along the longitudinal axis, and wherein said workholding apparatus has a fixed jaw member attached to the base and a first movable support member supported on the base for longitudinal movement along the slot toward and away from the fixed jaw member and said first jaw member attached to the first movable support member and wherein said means for permitting comprises a first opening in said plate member for receiving the first movable support member therein, said first opening being completely covered by said first jaw member when said first jaw member is attached to said first movable support member such that said first jaw member and said plate member completely cover the slot when said plate member is received on said base and said first jaw is attached to said first movable support member to prevent debris from entering therein.

3. The shield of claim 2 wherein said first opening is sized to limit the travel of the first support member to a first predetermined path of axial travel in the slot such that the first jaw member always covers said first opening during the clamping operation.

4. The shield of claim 2 wherein the workholder further has a second movable support member supported on the base for longitudinal movement along the slot toward and away from the fixed jaw member and said second jaw member attached to the second support member and wherein said plate member further comprises a second opening therein for receiving the second support member therein, said second opening being completely covered by the second jaw member such that the first and second jaw members and said plate member completely cover the slot to prevent debris from entering therein.

5. The shield of claim 4 wherein said second opening is sized to limit the longitudinal travel of the second support member to a second predetermined path of axial travel such that the second jaw member always covers said secondary opening during the clamping operation.

6. A shield for use in connection with a workholding apparatus for clamping a workpiece, said apparatus having a base, having a longitudinal axis a top surface and two spaced lateral sides substantially parallel to said longitudinal axis, said base having a maximum first overall width transverse to said longitudinal axis and a longitudinal slot in said top surface extending along the longitudinal axis, a fixed jaw member attached to the base and first and second movable support members each being supported on the base for longitudinal movement along the slot toward and away from the fixed jaw member, a first jaw member attached to the first movable support member and a second jaw member attached to the second movable support member, the shield comprising a plate member removably received on the base between the first and second jaw members and the base, said plate member having a second width transverse to said longitudinal axis that is greater than said first width such that said plate member extends beyond at least one said lateral side of the base when it is received thereon, said plate member having a first opening therein for receiving the first movable support member therein and a second opening for receiving the second movable support member therein, said plate member and the first and second jaw members substantially completely covering the slot during the entire clamping operation when said plate member is received on said base and said first and second jaw members are attached to said first and second support members, respectively.

7. The shield of claim 6 wherein said first opening is sized to limit the travel of the first support member to a first predetermined path of axial travel such that the first jaw member always covers said first opening and wherein said second opening is sized to limit the travel of the second support member to a second predetermined path of axial travel such that the second jaw member always covers said secondary opening during the clamping operation.

8. A shield for use in connection with a workholding apparatus for clamping a workpiece, said apparatus comprising having a base having a longitudinal axis and a first longitudinal slot extending along the longitudinal axis, a center jaw member attached to the base and first and second movable support members each being supported on the base for longitudinal movement along the slot toward and away from the center jaw member, a first jaw member attached to the first support member and a second jaw member attached to the second support member, the shield comprising:

a plate member removably received on the base between the first and second jaw members and the base, said plate member having a longitudinal opening therein for receiving the first and second support members therein such that the first and second support members can be selectively advanced toward and away from said center jaw member; and a longitudinally telescoping cover plate assembly slidably received in a guiding means of said removable plate member, said cover plate assembly spanning said longitudinal opening therein and being selectively coextensive therewith, said telescoping cover plate assembly attached to said first and second movable support members for travel therewith such that said cover plate assembly, in cooperation with the first and second jaw members, substantially completely covers the slot in the base during the clamping operation.

9. The shield of claim 8 wherein said cover plate assembly comprises:

a first cover plate slidably received in said guiding means of said removable plate member and spanning a portion of said longitudinal opening in said removable plate member, said first cover plate configured to engage the first movable support member for travel therewith; and a second cover plate slidably received in said guiding means of said removeable plate member in overlapping relationship with said first cover plate member and spanning a portion of said longitudinal opening therein, said second cover plate member being configured to engage the second movable support member for travel therewith.

10. The shield of claim 9 wherein said guiding means further comprising groove means in said plate member, said groove means being adjacent to said longitudinal opening for slidably receiving said first and second cover plate members therein.

11. The shield of claim 9 wherein said first cover plate member has a first hook-shaped portion thereon adapted to engage a first engagement portion on the first movable support member to attach said first cover plate member to the first movable member and wherein said second cover plate member has a second hook-shaped portion thereon adapted to engage a second engagement portion on the second movable support member to attach said second cover plate member to the secondary movable support member.

12. The shield of claim 8 wherein the base of the workholder has a first overall width and said plate member has a second width that is wider than said first width.

\* \* \* \* \*

UNITED STATES PATENT AND TRADEMARK OFFICE
CERTIFICATE OF CORRECTION

PATENT NO. : 5,634,253
DATED : June 3, 1997
INVENTOR(S) : George R. Swann

It is certified that error appears in the above-indentified patent and that said Letters Patent is hereby corrected as shown below:

Col. 12, line 49, delete "has" and substitute therefor --having--.

Col. 13, line 39, delete "secondary" and substitute therefor --second--.

Col. 14, line 8, delete "secondary" and substitute therefor --second--.

Signed and Sealed this

Fourteenth Day of September, 1999

*Attest:*

Q. TODD DICKINSON

*Attesting Officer*     Acting Commissioner of Patents and Trademarks